UNITED STATES PATENT OFFICE 2,549,840

SEPARATION AND FRACTIONATION OF SUGARS

Edna M. Montgomery, Peoria Heights, and Francis B. Weakley, Peoria, Ill., assignors to the United States of America as represented by the Secretary of Agriculture No Drawing. Application July 29, 1949,
Serial No. 107,623

11 Claims. (Cl. 127—55)

(Granted under the act of March 3, 1883, as
amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the fractionation and isolation of sugars contained in sugar solutions and to the subsequent recovery of pure sugars therefrom. More particularly, this invention is concerned with the removal of heretofore difficultly separable components from an aqueous solution containing sugars, by adsorption, a particular adaptation of the invention being the fractionation of a solution containing two or more sugars into pure fractions.

Aqueous solutions of certain sugars, such as glucose, occur industrially in the hydrolysis of amylaceous or cellulosic materials. For example, large quantities of glucose solutions are prepared by the hydrolysis of starch in the manufacture of corn syrup, corn sugar and dextrose. These solutions contain minor but significant amounts of impurities such as other sugars not removed by conventional refining procedure. This invention has among its objects the fractionation of such sugar solutions, as well as similar solutions or aqueous byproduct solutions of the corn sugar refining industry.

Another object of the invention is the separation by preferential adsorption and recovery of valuable sugars contained in glucose solutions that have heretofore been difficult if not impossible to separate by prior commercial methods.

According to our invention, an aqueous solution containing a sugar or sugars, for example, glucose, is contacted with a mass comprising activated carbon as an adsorbent, and the invention includes adsorption and displacement procedures whereby the individual sugars may be recovered as their pure aqueous solutions.

Our process permits a separation of monosaccharides from disaccharides and sugars of higher molecular weight. The adsorbent mass in practice is usually in the form of a column or series of columns. In sugar solutions which are passed onto the columns, the glucose remains principally in the aqueous solution and soon appears in the effluent. The small amount of glucose adsorbed may be completely removed by aqueous washing. The monosaccharides may thus be separated by selective adsorption of the higher molecular weight sugars and the impurities of the original solution. The higher sugars, retained on the carbon, are then displaced selectively and recovered in the order of displacement.

The process of this invention is not to be confused with the conventional clarification of sugar solutions by carbons. Bone char, charcoal and the like are customarily employed to remove proteins and coloring matter from commercial sugar solutions. During this conventional process, the carbon tends to adsorb impurities including small amounts of all types of sugars present in the original sugar solution. In fact, the adsorpton of sugars as a class is a well-known phenomenon, and they are known to be adsorbable upon various agencies. No one to our knowledge has ever successfully employed active carbon, or other adsorbent material as a practical means for separating and/or isolating sugars by selective adsorption and displacement Our invention may be carried out by passing the solution to be purified through a column containing activated carbon. The carbon employed may be any of the activated carbons available commercially, for example, Darco G60 or carbon of similar properties. The carbon is preferably mixed with an inert substantially non-adsorbent diluent material, such as Celite #501, a diatomaceous silica filter aid, or similar material, for the purpose of promoting contact with the adsorbent and facilitating flow of the solution. The most satisfactory mixture according to our experience has been a 1:1 by volume ratio of active carbon to diluent Obviously, this ratio may be varied within wide limits by anyone skilled in the art.

In practicing the invention we have noted that in the initial period of operation the effluent liquid is poor in glucose, since glucose itself is adsorbed in the column as noted previously. As the flow proceeds, the adsorbed glucose is displaced by other materials, such as higher sugars or by water and thereafter the effluent consists of a chemically pure solution of glucose. The peak concentration of the effluent is usually equal to the concentration of the glucose entering the column. Overall recovery yields approach the quantitative.

In addition to the glucose solutions produced by hydrolysis of polyglucosides, such as starch or cellulose, other glucose-containing solutions may be purified by our invention. For example, the solution remaining after crystallization of glucose from hydrolytic solutions, known as "hydrol," may be purified and the glucose and other sugars recovered in high yield.

Although our invention therefore involves the separation and recovery of glucose from aqueous solutions containing other closely related components which have heretofore been inseparable, broadly, our invention is not limited to the purification of glucose. The principle may be utilized to separate and recover two or more heretofore inseparable sugars, such as for example, glucose and isomaltose from an aqueous solution containing them. In this particular adaptation of our invention, the pure glucose is obtained as the effluent solution, whereas the isomaltose is retained on the adsorbent and is recoverable in pure form by displacement with aqueous phenol or ephedrine.

Our invention depends upon the differences in adsorbability between the sugars or other closely related materials existing in the solution to be purified. Of specific importance is our discoverey that at pH 5.5 to 6.5 the monosaccharide such as glucose is adsorbed only weakly, and soon appears in the effluent during the treatment. It can be separated completely from the other sugars present by aqueous washing of the adsorbent mass. Other sugar solutions containing sucrose, xylose, or the like may be separated from impurities or from each other by adsorption and desorption in accordance with our invention.

The rate of flow and length of the column depends somewhat on the nature of the solution. For a glucose-isomaltose solution the concentration of the solution may vary from 0.5 percent up to 30 per cent total sugars.

Our invention moreover includes the selective displacement or desorption of adsorbed sugars from the adsorbent medium. We have discovered that the adsorbed sugars may be displaced in much the same manner as the glucose or other monosaccharide is displaced by water. We have discovered that aqueous solutions of phenol, acetic acid or ephedrine may be used for this purpose. The concentrations of the displacing or desorbent solutions may vary from 0.2 to 10 percent.

Within the range of 0.2 to 0.7 percent the displacing solution displaces the adsorbed sugars selectively. If the adsorbed sugars are of different molecular weights, the displacement effluent contains a pure sugar until all of that type has been displaced. The content of the effluent then changes to another sugar. Sugars of like molecular weight may even be separated in two or three successive treatments, or by varying the desorbent.

In the manner described above we are able to displace an adsorbed mixture and recover the pure constituents of the mixture by separating the displacement effluent into the corresponding series of purified solutions. A working analysis of the fractions contained in the solutions may be accomplished conveniently by a comparison of the optical analysis and reducing power of the effluent made at frequent intervals, thus determining the point of change from one sugar to another. Higher concentrations of the displacing agency remove the higher molecular weight sugars, such as trisaccharides and the like.

The above phenomenon of selective displacement makes possible the separation of the adsorbed surgars into valuable fractions. If the amount of higher sugars is negligible, or recovery not desired for other reasons the adsorbent column may be regenerated by the same phenomenon, i. e., displacing adsorbed impurities with aqueous solutions of phenol or ephedrine followed by washing with methanol. The following specific examples are illustrative of the invention.

*Example 1*

A starch conversion liquid, obtained by hydrolyzing waxy corn starch with the enzyme system obtained from *Aspergillus oryzae*, was clarified and deionized according to known procedure. This solution as obtained from the ion-exchange step was passed through three adsorption units set up in a vertical series. Each unit consisted of a glass column 32 x 7.5 cm., packed with 1:1 by volume mixture of activated carbon (Darco G-60) and Celite (#501) to a height of approximately 20 cm.

The total volume of solution fed was 11.86 l. The feed contained a total of 165.7 g. of sugar, calculated as anhydrous dextrose by the Munson-Walker reducing method. The effluent was observed closely. No significant glucose came off in the first 4 liters. In the fifth the glucose began to appear, and the adsorption flow continued until the total amount was fed in. The column was then washed with distilled water.

After a total of 29 liters of effluent, the glucose content had dropped to a negligible flow, indicating that the columns were freed of glucose.

The total glucose of the effluent calculated as anhydrous dextrose was 153.4 g. The calculation indicates a deficiency of 12.3 grams, determined as dextrose to be accounted for as other sugars.

An aqueous solution of 0.5 percent phenol was then added to the series of columns, and the effluent examined at every successive liter. After 6 liters of effluent, $[\alpha]_D^{25°}+113°$ determined as maltose hydrate, had been collected, the optical rotation changed sharply $[\alpha]_D^{25°}$ from the range $+113°$ to $+117°$, to $+121°$. The 6 liters contained iso-maltose in an amount corresponding to 6.0 grams calculated as anhydrous dextrose or 12 grams as maltose hydrate.

Four subsequent liters give 4.0 grams of sugar determined as anhydrous dextrose. From this point on the effluent failed to give significant optical readings or reducing values due to extreme dilution. The next twelve liters of tailings were concentrated, and the concentrate was found to contain 1.9 grams of sugar calculated as dextrose.

In the above example, the bulk of glucose was contained in the first several liters of effluent of the first stage (discounting the initial effluent portion which contained no glucose). The $\alpha$-glucose monohydrate crystals recoverable in this process are brilliant white and are uniform and perfect, comparable to the best analytical dextrose monohydrate.

*Example II*

In this example, a commercial sample of hydrol, obtained in the acid hydrolysis of starch, containing approximately 72 percent solids was employed. The glucose content was 62.5 percent on a dry, ash-free basis. This value was given by the manufacturer as an approximation based on accepted analytical determinations. The sample was diluted ten times with distilled water and clarified with basic lead acetate in accordance with known procedure.

The diluted hydrol was then passed through ion exchange beds to remove ions of soluble salts such as the sodium ion and the chloride ion, in accordance with known procedure. The final pH of the clarified and deionized solution was 5.5.

The solution was then passed through an adsorption column such as described in Example I. The total volume of solution fed was 9.15 liters, and contained a total 248.4 g. of sugar determined as anhydrous dextrose by the Munson-Walker method. No significant glucose came off in the first 4 liters of effluent, but began to appear in the fifth liter. The glucose flow continued up to the ninth liter of effluent at which time other sugars began to appear as indicated by a change in the optical rotation of the effluent as in Example I. From these four liters 92 grams of pure crystalline dextrose was recovered.

The flow was continued through the column, until the total had been fed, and the feed solution was followed by a distilled water wash, the column was then cleared by displacing with 0.5 percent aqueous phenol solution, and the displacement effluent saved. The total sugar calculated as dextrose recovered in this effluent was quantitative.

That portion of the effluent beginning with the ninth liter was combined with the displacement effluent, and the mixture concentrated in vacuo to a volume of 5.57 liters. Alternatively, the two effluents may be readsorbed separately, thus enabling the more direct recovery of the remainder of the glucose which was present in the adsorption effluent after the water wash.

The concentrated mixture was readsorbed as before, the glucose appearing in significant amounts during the fourth liter of effluent, which continued as a pure glucose solution for three more liters. The feed solution was followed by a distilled water wash, and the flow continued until the amount of sugar in the effluent was negligible.

The residual material, not removed by aqueous wash was then selectively displaced. Three successive fractions were obtained as follows. Fraction a consisted of a small amount of unidentified disaccharide recovered as the initial fraction from a 0.5 percent aqueous phenol displacement. Fraction b consisted of isomaltose recovered as the second fraction from the 0.5 aqueous phenol displacement. Fraction c consisted of gentiobiose recovered by displacement with 0.2 percent aqueous acetic acid. Both fractions b and c were identified by their crystalline derivatives. In the foregoing process, a total of 209 g. of glucose (10 g. of syrup and 199 g. of anhydrous crystalline dextrose isolated as α-D-glucose monohydrate) was recovered. This compares with the total initial quantity of sugars, calculated as dextrose (a part of which are accounted for as disaccharides), as somewhat more than the 60–62 percent to be expected from quantitative recovery according to previous analyses.

In the preceding example the use of a larger capacity column would obviate the necessity for the readsorption steps.

We claim:

1. The process which comprises contacting an aqueous solution containing glucose and polysaccharides with activated carbon whereby the polysaccharide sugars are removed from the solution by relatively strong adsorption upon the carbon, subsequently displacing less strongly adsorbed glucose with water, recovering the thus purified glucose solution, displacing the adsorbed polysaccharides from the carbon by eluting with one of the group consisting of phenol, acetic acid and ephedrine in 0.2 to 10 percent aqueous solution, and recovering the displaced polysaccharide solution.

2. The method of claim 1 in which the disaccharide sugars are recovered in the order of displacement, and the displacing solution is from 0.2 to 0.7 percent concentration.

3. The process of claim 1 in which the initial aqueous solution contains glucose and isomaltose.

4. The process which comprises contacting an aqueous solution containing glucose and polysaccharides obtained by enzyme hydrolysis of amylaceous material with an adsorbent body comprising a mixture of activated carbon and an inert diluent material, washing the adsorbent body with water and recovering the thus purified solution containing glucose, displacing the adsorbed sugars from the adsorbent body by eluting with a 0.2 to 0.7 percent aqueous solution of phenol and recovering the displaced polysaccharide solution.

5. The process which comprises contacting an aqueous solution of hydrol, from which ions of soluble salts have been removed, with an adsorbent body comprising a mixture of activated carbon and an inert finely divided diluent material at a pH of about 5.5 to 6.5, washing the adsorbent body with water and recovering the thus purified solution containing glucose, displacing the adsorbed sugars consecutively and selectively by eluting with a 0.2 to 0.7 percent aqueous solution of phenol and recovering isomaltose from the eluent.

6. Process of claim 5 in which the phenol displacement is followed by a 0.2 to 0.7 acetic acid displacement to recover further sugars from the adsorbent body.

7. The process of recovering glucose from an aqueous solution of glucose and polysaccharides comprising: removing ions of soluble salts from the solution, contacting the aqueous solution with activated carbon at a pH of about 5.5 to 6.5, the polysaccharides being preferentially adsorbed thereby, displacing adsorbed glucose by washing the carbon with water, and thereafter displacing the polysaccharides from the activated carbon by eluting with one of the group consisting of phenol, acetic acid, and ephedrine in 0.2 to 10 percent aqueous solution.

8. The process of claim 7 in which the polysaccharides are displaced by washing with 0.2 to 0.7 percent aqueous phenol.

9. The process of claim 7 in which the polysaccharides are displaced by washing with 0.2 to 0.7 percent aqueous acetic acid.

10. The process of claim 7 in which the polysaccharides are displaced by washing with 0.2 to 0.7 percent aqueous ephedrine.

11. The process of claim 7 in which the aqueous solution is hydrol.

EDNA M. MONTGOMERY.
FRANCIS B. WEAKLEY.

REFERENCES CITED

The following references are of record in the file of this patent:

Jour. Amer. Chem. Soc. (Brinkley et al.), vol. 67 (1945), pp. 1789–1793.

The Int. Sugar Jour., Nov. 1947, page 248.

Nature, Sept. 18, 1948, vol. 162, page 448.